(12) United States Patent
Ha et al.

(10) Patent No.: US 12,130,433 B2
(45) Date of Patent: Oct. 29, 2024

(54) OPTICAL DEVICE FOR AUGMENTED REALITY

(71) Applicant: LETINAR CO., LTD, Anyang-si (KR)

(72) Inventors: Jeong Hun Ha, Seoul (KR); Soon Gi Park, Seoul (KR)

(73) Assignee: LETINAR CO., LTD., Anyang-si (KR)

( * ) Notice: Subject to any disclaimer, the term of this patent is extended or adjusted under 35 U.S.C. 154(b) by 752 days.

(21) Appl. No.: 17/290,168

(22) PCT Filed: Aug. 30, 2019

(86) PCT No.: PCT/KR2019/011140
§ 371 (c)(1),
(2) Date: Apr. 29, 2021

(87) PCT Pub. No.: WO2020/096186
PCT Pub. Date: May 14, 2020

(65) Prior Publication Data
US 2022/0043266 A1    Feb. 10, 2022

(30) Foreign Application Priority Data

Nov. 6, 2018    (KR) .................... 10-2018-0134978

(51) Int. Cl.
*G02B 27/00*    (2006.01)
*G02B 27/01*    (2006.01)

(52) U.S. Cl.
CPC .. *G02B 27/0172* (2013.01); *G02B 2027/0118* (2013.01); *G02B 2027/0123* (2013.01)

(58) Field of Classification Search
CPC .... G02B 2027/0163; G02B 2027/0165; G02B 2027/0167; G02B 2027/0169; G02B 2027/0174; G02B 2027/0178; G02B 2027/0181; G02B 2027/0183; G02B 2027/0185; G02B 2027/0187; G02B 2027/019; G02B 2027/0192; G02B 2027/0194; G02B 2027/0196; G02B 2027/0198; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143;
(Continued)

(56) References Cited

U.S. PATENT DOCUMENTS 11,237,628 B1 *   2/2022   Sharma ................. H04N 23/56
2018/0149869 A1 * 5/2018   Bergquist .............. G02C 7/165

FOREIGN PATENT DOCUMENTS

EP    3104215 A1    12/2016
JP    2018-136454 A   8/2018
(Continued)

*Primary Examiner* — Henry Duong
(74) *Attorney, Agent, or Firm* — Rabin & Berdo, P.C.

(57) ABSTRACT

The present invention relates to an optical device for augmented reality, and provides an optical device for augmented reality, the optical device including: a plurality of reflective units arranged to reflect image light, output from an image output unit configured to output image light corresponding to an image for augmented reality, toward the pupil of an eye of an user; wherein each of the plurality of reflective units is disposed such that the distance to an adjacent reflective unit is 8 mm or less.

14 Claims, 10 Drawing Sheets

(58) Field of Classification Search
CPC .... G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 27/01; G02B 27/0101; G02B 27/0103; G02B 27/0149; G02B 27/017; G02B 27/0172; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123
USPC .......................................................... 359/630
See application file for complete search history.

(56) References Cited

FOREIGN PATENT DOCUMENTS

| KR | 10-2016-0091402 A | 8/2016 |
|---|---|---|
| KR | 10-1660519 B1 | 9/2016 |
| KR | 10-2018-0028339 A | 3/2018 |
| KR | 10-2018-0058844 A | 6/2018 |

* cited by examiner

OPTICAL DEVICE FOR AUGMENTED REALITY

TECHNICAL FIELD

The present invention relates generally to an optical device for augmented reality, and more particularly to an optical device for augmented reality that is capable of providing virtual images for augmented reality to a user by using a plurality of small-sized reflective units.

BACKGROUND ART

Augmented Reality (AR) refers to technology that superimposes a virtual image, generated by a computer or the like, on a real image of the real world and then provides a resulting image, as is well known.

In order to implement augmented reality, there is required an optical system that allows a virtual image, generated by a device such as a computer, to be superimposed on an image of the real world and then allows a resulting image to be provided. As such an optical system, there is known a technology using an optical means such as a prism for reflecting or refracting a virtual image by using a head-mounted display (HMD) or a glasses-type device.

However, devices using the conventional optical system have problems in that it is inconvenient for a user to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed technologies such as a configuration like a prism capable of adjusting focal length for a virtual image or a configuration using electrically controlling a variable focal lens in response to a change in focal length. However, these technologies also have problems in that a user needs to perform a separate operation in order to adjust focal length or in that hardware and software such as a separate processor for controlling focal length are required.

In order to overcome the problems of these conventional technologies, the applicant of the present application has developed an apparatus that can implement augmented reality by projecting a virtual image onto the retina through the pupil using a reflective unit having a size smaller than that of a human pupil, as described in Prior Art Document. According to this Prior Art Document, the apparatus for implementing augmented reality is configured in the form of glasses and a reflective unit is disposed on the surface of a glass lens or inside a glass lens to reflect a virtual image generated by a display unit so that an image is formed on the retina through the pupil. Accordingly, a kind of pinhole effect is provided by increasing the depth of field (DoF), so that a clear virtual image may always be provided regardless of whether the user changes the focal length while gazing at the real world. However, the technology of the present applicant has a limitation in that the field of view (FoV) is narrow because the small reflective unit is used.

PRIOR ART DOCUMENT

Korean Patent No. 10-1660519 (published on Sep. 29, 2016)

DISCLOSURE

Technical Problem

The present invention has been conceived to overcome the above-described problems, and an object of the present invention is to provide an optical device for augmented reality that may provide an image for augmented reality by using a plurality of reflective units smaller than the pupil.

In particular, another object of the present invention is to provide an optical device for augmented reality that can widen field of view and also improve luminous uniformity by using a plurality of reflective units smaller than the pupil.

Furthermore, another object of the present invention is to provide an optical device for augmented reality that provides the wide field of view without disconnection of virtual images for augmented reality by forming the distance between the reflective units to be smaller than the size of the pupil.

Moreover, still another object of the present invention is to provide an optical device for augmented reality that may widen field of view and increase an eye box by using a plurality of reflective units smaller than the pupil in addition to generating a pinhole effect by increasing the depth of field.

Technical Solution

In order to accomplish the above objects, the present invention provides an optical device for augmented reality, the optical device including: a plurality of reflective units arranged to reflect image light, output from an image output unit configured to output image light corresponding to an image for augmented reality, toward the pupil of an eye of an user; wherein each of the plurality of reflective units is disposed such that the distance to an adjacent reflective unit is 8 mm or less.

In this case, the distance between the adjacent reflective units may be a minimum value between points on the boundary lines of the orthogonal projections of the adjacent reflective units projected onto a plane perpendicular to a forward direction from the pupil when the user gazes forward.

Furthermore, the distance between the adjacent reflective units may be a minimum value between points on the boundary lines of the orthogonal projections of the adjacent reflective units projected onto a plane perpendicular to a direction from the pupil to the reflective units when the user gazes in the direction of the reflective units.

Furthermore, the size of each of the plurality of reflective units may be 8 mm or less.

Furthermore, the size of each of the plurality of reflective units may be a maximum length between any two points on the boundary lines of corresponding reflective units.

Furthermore, the size of each of the plurality of reflective units may be a maximum length between any two points on the boundary lines of the orthogonal projections of corresponding reflective units projected onto a plane perpendicular to a forward direction from the pupil when the user gazes forward.

Furthermore, the size of each of the plurality of reflective units may be a maximum length between any two points on the boundary lines of the orthogonal projections of corresponding reflective units projected onto a plane perpendicular to a direction from the pupil to the reflective units when the user gazes in the direction of the reflective units.

Furthermore, the area of each of the plurality of reflective unit may be formed to have a value of $16\pi$ (mm²) or less.

Furthermore, the area of each of the plurality of reflective unit may be the area of the orthogonal projection of the reflective unit projected onto a plane perpendicular to a forward direction from the pupil when the user gazes forward.

Furthermore, the area of each of the plurality of reflective unit may be the area of the orthogonal projection of the reflective unit projected onto a plane perpendicular to a direction from the pupil to the reflective unit when the user gazes in the direction of the reflective unit.

Furthermore, the shape of each of the plurality of reflective units may be formed in an asymmetric shape representing a shape other than a point-symmetric shape.

Furthermore, the point-symmetric shape may be a shape in which there is a specific point that allows the shape to be always the same for all rotation angles when a corresponding reflective unit is rotated around a specific point on the plane of the reflective unit, and the asymmetric shape may be a shape that is not a point-symmetric shape, which is a shape in which there is no specific point that allows the shape to be always the same for all rotation angles when a corresponding reflective unit is rotated around a specific point on the plane of the reflective unit.

Furthermore, the shape of each of the plurality of reflective units may be a point-symmetric shape in which a through hole is formed in the center thereof.

Moreover, at least some of the plurality of reflective units have a different shape.

Advantageous Effects

According to the present invention, there may be provided an optical device for augmented reality that may provide an image for augmented reality by using a plurality of reflective units smaller than the pupil.

Furthermore, the present invention may provide an optical device for augmented reality that can widen field of view and also improve luminous uniformity by using a plurality of reflective units smaller than the pupil.

Furthermore, the present invention may provide an optical device for augmented reality that provides the wide field of view without disconnection of virtual images for augmented reality by forming the distance between the reflective units to be smaller than the size of the pupil.

Furthermore, the present invention may provide an optical device for augmented reality that may widen field of view and increase an eye box by using a plurality of reflective units smaller than the pupil in addition to generating a pinhole effect by increasing the depth of field.

DESCRIPTION OF DRAWINGS

FIGS. 1 and 2 are diagrams illustrating the overall configuration of an optical device (100) for augmented reality according to one embodiment of the present invention, wherein FIG. 1 is a front view when a user views the optical device (100) for augmented reality and FIG. 2 is a side view of the optical device (100) for augmented reality;

BEST MODE

Embodiments of the present invention will be described in detail below with reference to the accompanying drawings.

Figure 1:
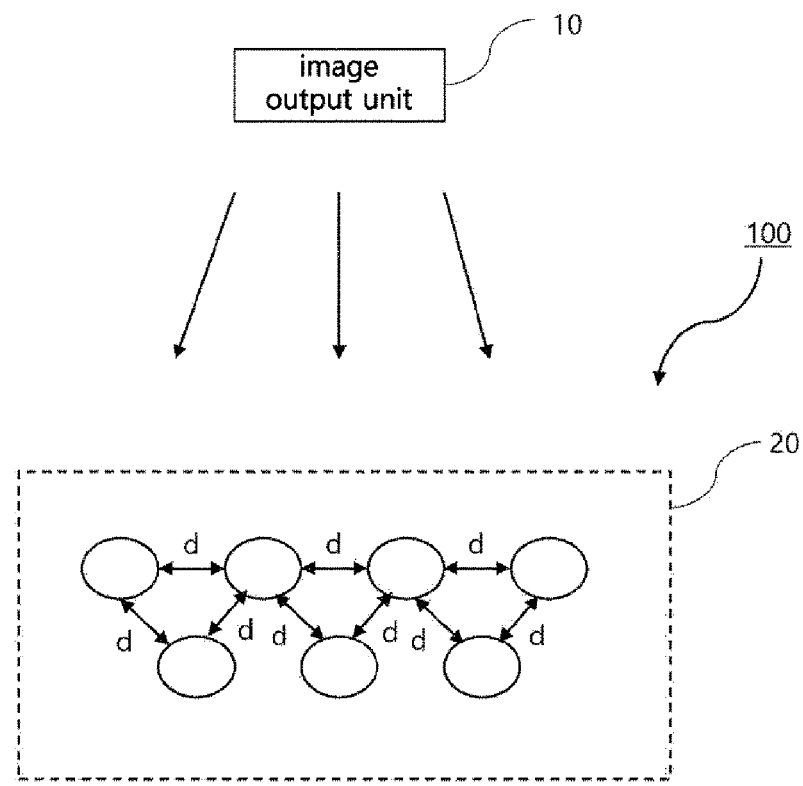
Figure 2:
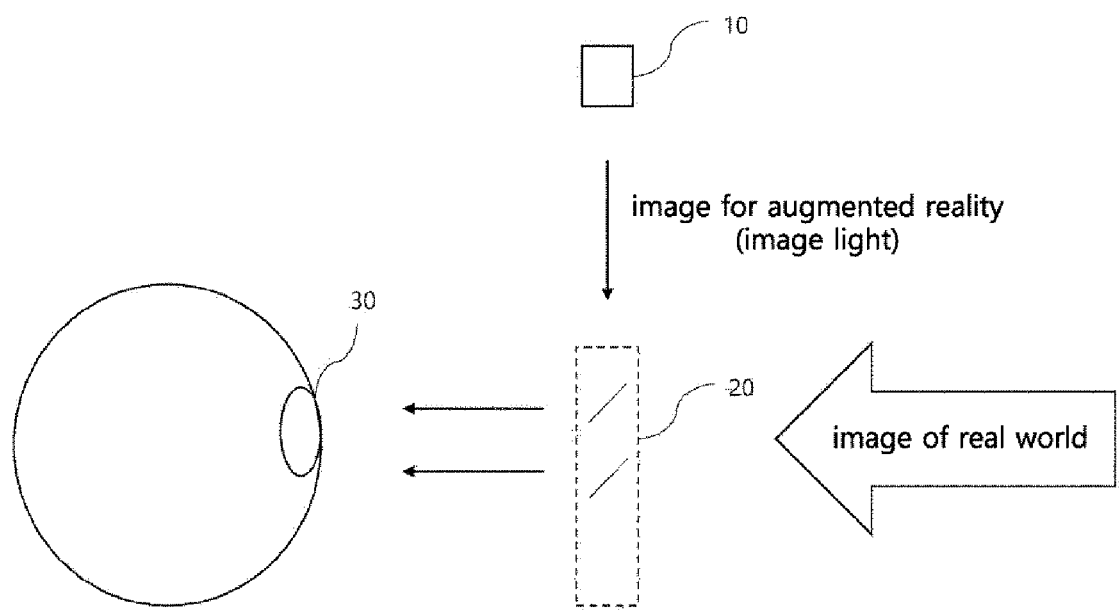

FIGS. 1 and 2 are diagrams illustrating the overall configuration of an optical device 100 for augmented reality according to one embodiment of the present invention, wherein FIG. 1 is a front view when the optical device 100 for augmented reality is placed in front of a user and then viewed and FIG. 2 is a side view when the optical device 100 for augmented reality is placed in front of the user.

Referring to FIG. 1, the optical device 100 for augmented reality (hereinafter simply referred to as the "optical device 100") of the present embodiment includes a plurality of reflective units 20 that provides virtual image which is an image for augmented reality to a user by reflecting image light, output from an image output unit 10 configured to output image light corresponding to an image for augmented reality, to the pupil 30 of an eye of the user.

The image output unit 10 is a means for outputting image light corresponding to an image for augmented reality to the reflective units 20, and may be a display device such as a small-sized liquid crystal display (LCD).

The display device is a means for displaying an image for augmented reality on a screen. The display unit displays virtual image for augmented reality and emits light from the virtual image so that the reflective units 20 may reflect light from the virtual image and have the reflected light projected into a pupil of a user. Image light corresponding to the displayed image for augmented reality is output from the display unit and transmitted to the reflective units 20.

Meanwhile, the image output unit 10 may be a reflection means or refractive means that is disposed between the above-described display device and the reflective units 20 and transmits image light output from the display device to the reflective units 20 by reflecting or refracting the image light output from the display device. In this case, the image light output from the display device is not directly output to the reflective units 20 but is transmitted to the reflective units 20 via a reflective means or a refractive means.

Furthermore, the image output unit 10 may be a collimator that outputs image light from the display device as collimated parallel light. Alternatively, the collimator may be included in the reflective means or refractive means and the display device.

In other words, the image output unit 10 may include various means, such as a reflective means or refractive means, for finally transmitting image light, output from a display device configured to display an image for augmented reality, to the reflective units 20.

Here, the image for augmented reality refers to an image displayed on the display device, which is a virtual image provided through a pupil of a user via the reflective units 20, and may be a still image or a moving image. The image for augmented reality is output from the image output unit 10 as image light corresponding to the image for augmented reality, and is provided as a virtual image through a pupil of a user via the plurality of reflective units 20. At the same time, the user receives an image of the real world that is directly recognized by an eye. Accordingly, the user may be provided with an augmented reality service.

Meanwhile, although the image output unit 10 is disposed in an upper portion when a user gazes forward in FIGS. 1 and 2, the location of the image output unit 10 is not limited thereto, but the image output unit 10 may be disposed at a side location or a diagonal upper or lower location. For example, when an apparatus for implementing augmented reality including the optical device 100 for augmented reality according to the present invention is implemented in the form of, e.g., glasses, the image output unit 10 may be disposed at an appropriate location on a glasses frame.

The display device may have only the function of receiving an image signal from an external separate image playback device and simply displaying an image, or may be integrated with a device having a processor and memory and also having the function of storing and playing back an image.

Since the display device itself is not a direct target of the present invention and any conventionally known device capable of displaying an image on a screen may be employed, a detailed description thereof will be omitted.

Meanwhile, the plurality of reflective units 20 performs the function of reflecting the image light corresponding to the image for augmented reality, output from the image output unit 10, toward the pupil 30 of the eye of the user, thereby providing the image for augmented reality to the user.

As shown in FIG. 2, the plurality of reflective units 20 reflects the image light corresponding to the image for augmented reality, output from the image output unit 10, toward the pupil 30, so that the image for augmented reality and an image of the real world are superimposed on each other and then provided, thereby providing an augmented reality service. In other words, the plurality of reflective units 20 reflects the image light, output from the image output unit 10, toward the pupil 30 of the eye of the user, thereby providing the user with the image for augmented reality displayed on the display device.

To this end, the plurality of reflection units 20 is disposed to have an appropriate angle between the image output unit 10 and the pupil 30. Preferably, the plurality of reflection units 20 is arranged to have an angle that allows the image light incident onto the center of the reflective units 20 to be reflected and incident onto the center of the pupil 30 when each of the plurality of reflective units 20 is located in front of the pupil 30 of the user.

For example, in FIGS. 1 and 2, it is assumed that the plurality of reflective units 20 is located in a forward direction from the pupil 30 and the image output unit 10 is located in an upper portion in the forward direction from the pupil when the user gazes forward. In this case, as shown in FIG. 2, each of the reflecting portions 20 is disposed to have an inclination of about 45 degrees and is inclined outward in the forward direction from the pupil.

Meanwhile, in the present invention, each of the plurality of reflective units 20 is characterized in that it is arranged such that the distance (d; see FIG. 1) to adjacent reflective units 20 is smaller than the size of the pupil 30 of a person.

In general, it is known that the size (diameter) of the pupils of people ranges from 2 to 8 mm on average. Accordingly, it is preferable that each of the plurality of reflective units 20 in the present invention is disposed such that the distance to adjacent reflective units 20 is 8 mm or less.

Here, as shown in FIG. 1, the distance d (or interval d) between the reflective units 20 may be the minimum value between points on the boundary lines of two adjacent reflective units 20 when the plurality of reflective units 20 is viewed from a location in front of the plurality of reflective units 20.

Furthermore, the distance d (or interval d) between the reflective units 20 may be the minimum value between points on the boundary lines of the orthogonal projections of the reflective units 20 projected onto a plane perpendicular to a forward direction from the pupil 30 when the user gazes forward.

Furthermore, the reflective units 20 may not be disposed in the center in the forward direction from the pupil of the user. In this case, the distance d (or interval d) between the reflective units 20 may be the minimum value between points on the boundary lines of the orthogonal projections of the reflective units 20 projected onto a plane perpendicular to a direction from the pupil 30 to the reflective units 20 when the user gazes in the direction of the reflective units 20.

Meanwhile, the distances d between the plurality of reflective units 20 are preferably the same, but are not necessarily the same. The distances d may be partially different when necessary.

Meanwhile, in the present invention, it is preferable that the size of each of the plurality of reflective units 20 be also smaller than the size of the pupils of people. In other words, it is preferable that the size of each of the plurality of reflective units 20 be 8 mm or less. Here, the size of the reflective units 20 is defined as the maximum length between any two points on the boundary line of each of the reflective units 20.

In this case, the size of the reflective units 20 may be the maximum length between any two points on the boundary lines of the orthogonal projections of the reflective units projected onto a plane perpendicular to a forward direction from the pupil 30 when the user gazes forward.

Furthermore, the reflective units 20 may not be disposed in the center in the forward direction from the pupil of the user. In this case, the size of the reflective units 20 may be the maximum length between any two points on the boundary lines of the orthogonal projections of the reflective units 20 projected onto a plane perpendicular to the direction from the pupil 30 to the reflective units 20 when the user gazes in the direction of the reflective units 20.

Meanwhile, the sizes of the plurality of reflective units 20 are preferably the same, but are not necessarily the same. The sizes may be partially different when necessary.

Furthermore, in the present invention, it is preferable that the area of the plurality of reflective units 20 may be formed to be smaller than the area of the pupils 30 of people. For example, when the pupils of people are considered to have a circular shape, the diameter of the pupils is 2 to 8 mm and the radius thereof is 1 to 4 mm. Accordingly, the area of the pupils is a maximum of $16\pi$ (mm$^2$) according to the equation "$\pi r^2$," and thus the area of each of the plurality of reflective units 20 may be formed to have a value of $16\pi$ (mm$^2$) or less.

In this case, the area of each of the plurality of reflective units 20 may be the area of an orthogonal projection obtained by projecting each of the reflective units 20 onto a plane perpendicular to a forward direction from the pupil 30 when the user gazes forward.

Furthermore, the reflector 20 may not be disposed in the center in the forward direction from the pupil of the user. In this case, the area of each of the reflective units 20 may be the area of the orthogonal projection of the reflective unit 20 projected onto a plane perpendicular to a direction from the pupil 30 to the reflective unit 20 when the user gazes in the direction of the reflective unit 20.

Meanwhile, the areas of the plurality of reflective units 20 are preferably the same, but are not necessarily the same. The areas may be partially different when necessary.

Meanwhile, when the device for augmented reality is implemented in the form of, e.g., glasses, the plurality of reflective units 20 may be disposed on the surface of a lens for the glasses, or may be disposed inside a lens for the glasses in an embedded form.

Alternatively, a plurality of reflective units 20 may be disposed on the surface of a separate lens or inside a separate lens to be implemented in the form of a lens module, and the lens module may be detachably coupled to a device for augmented reality in the form of glasses.

Next, the detailed configuration and operation of the plurality of reflective units 20 according to the embodiment of the present invention will be described in more detail below with reference to FIG. 3.

First, in order to more easily describe the basic principle of the present invention, an optical device for augmented reality in which one reflective unit is disposed will be described. This is similar to the technology disclosed in [Prior Art Document] as above, which was filed and registered by the present applicant.

Figure 3:
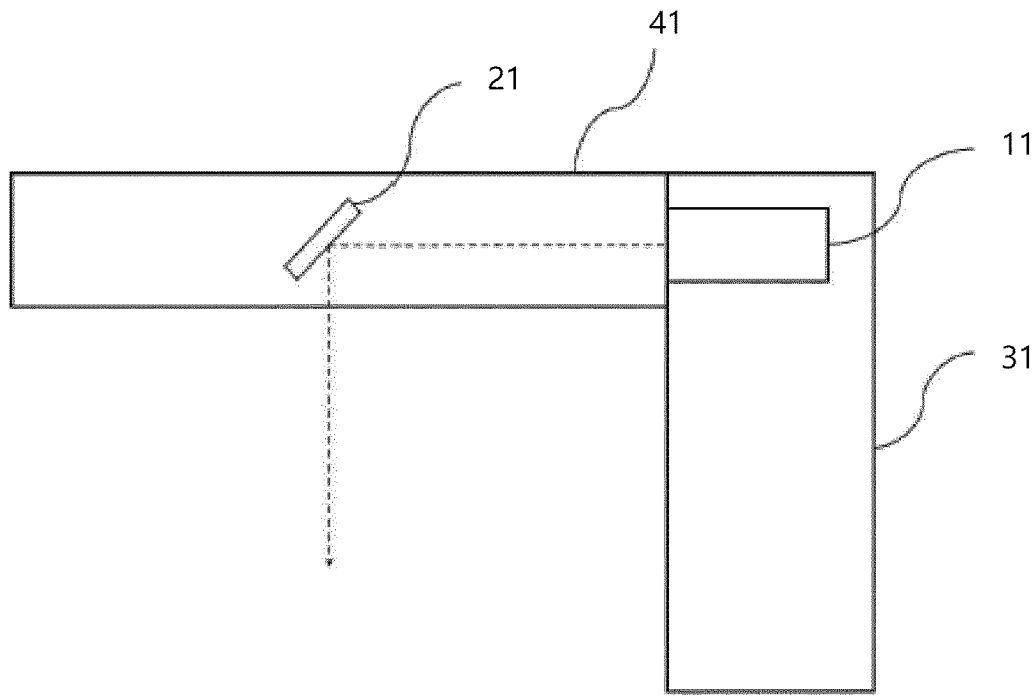
FIG. 3 is a diagram showing an optical device for augmented reality in which one reflective unit (21) is disposed.

FIG. 3 is a diagram showing an optical device for augmented reality in which one reflective unit 21 is disposed.

Referring to FIG. 3, an image output unit 11 is a means for outputting image light corresponding to an image for augmented reality, and is a display device in FIG. 3. The reflective unit 21 provides an image for augmented reality by reflecting the image light, output from the image output unit 11, toward a pupil of a user.

An auxiliary optical unit 41 is a means such as a glass lens, and the reflective unit 21 is embedded therein. A frame unit 31 is a means for fixing and supporting the image output unit 11 and the auxiliary optical unit 21.

The reflective unit 21 of FIG. 3 is formed to have a size smaller than the size of the pupils of people, i.e., 8 mm or less, as described above. When the reflective unit 21 is formed to be smaller than the size of the pupil as described above, the depth of field for light incident into the pupil through the reflective unit 21 may be made significantly deep. Here, the depth of field (DoF) refers to a range within which an image is recognized as being in focus. The deeper the depth of field, the deeper the focal length for an image for augmented reality. Accordingly, even when the user changes the focal length for the real world while gazing at the real world, an image for augmented reality is always recognized as being in focus regardless of the change of the focal length. This may be viewed as a type of pinhole effect.

Although the present applicant obtained a patent described in [Prior Art Document] with a focus on the above-described point, the structure using the single reflective unit 21 has a limitation in that the field of view is narrow.

Accordingly, in order to overcome the limitation in which the field of view is narrow, the present applicant proposes a structure in which a plurality of reflective units 20 is disposed and the distance between the reflective units 20 is set to a size smaller than the size of the pupil, i.e., 8 mm or less, as shown in FIGS. 1 and 2.

A principle in which the distance between the plurality of reflective units 20 should be smaller than the size of the pupil will be described below with reference to FIGS. 4 to 13.

Figure 4:
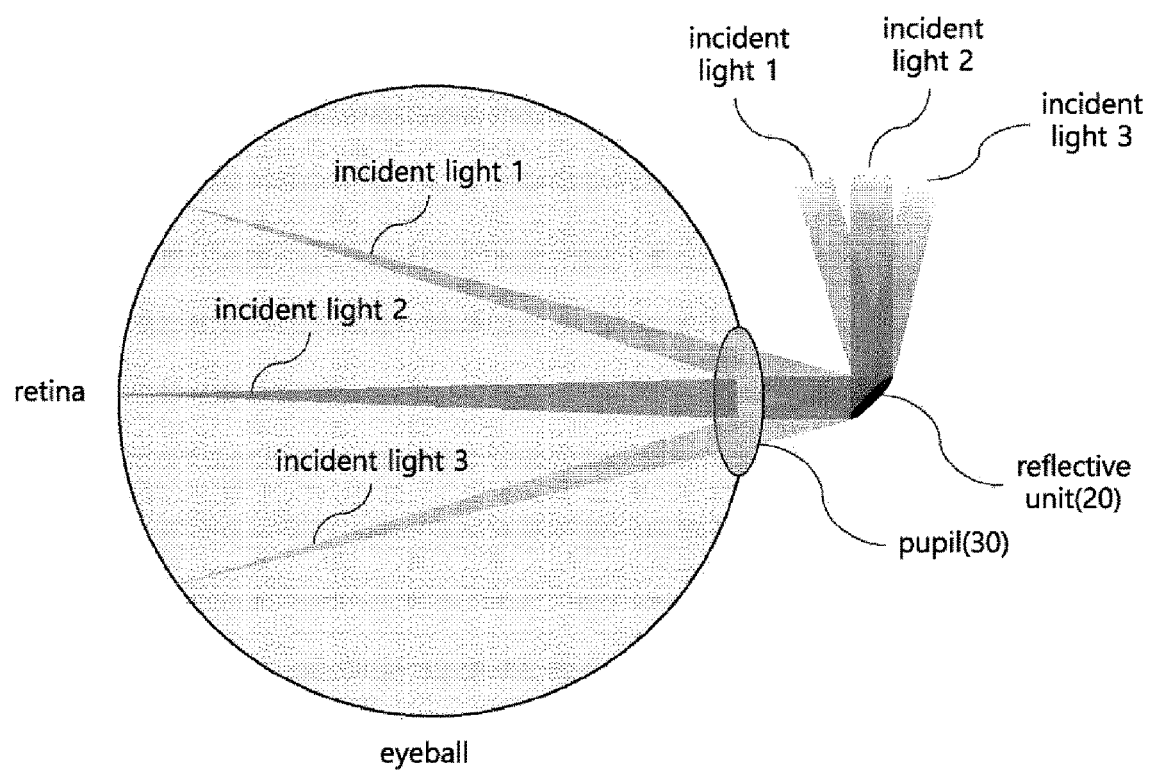
FIG. 4 is a diagram showing a principle by which incident light is reflected through one reflective unit (20) and forms an image on the retina.

FIG. 4 is a diagram showing a principle by which incident light is reflected through one reflective unit 20 and forms an image on the retina.

As shown in FIG. 4, the image light of an image for augmented reality radiated from the image output unit 10 is reflected by the reflective unit 20 and forms an image on the retina through the pupil 30, whereby a user may recognize an image for augmented reality.

In FIG. 4, incident light 1, incident light 2, and incident light 3 represent rays of incident light having different angles of incidence with respect to the eyeball, and it is assumed that all the rays of incident light are collimated parallel light. Although the collimated parallel light forms an image at a different location on the retina depending on the angle at which the light is incident on the eyeball, a person may not identify a difference in the location at which light is incident on the pupil 30. In other words, when rays of parallel light have the same location of an angle of incidence with respect to the eyeball, images are formed at the same location of the retina even when they pass through different locations of the pupil 30. When the locations of the angles of incidence with respect to the eyeball are different, images are imaged at different locations of the retina regardless of the location of the pupil 30.

Figure 5:
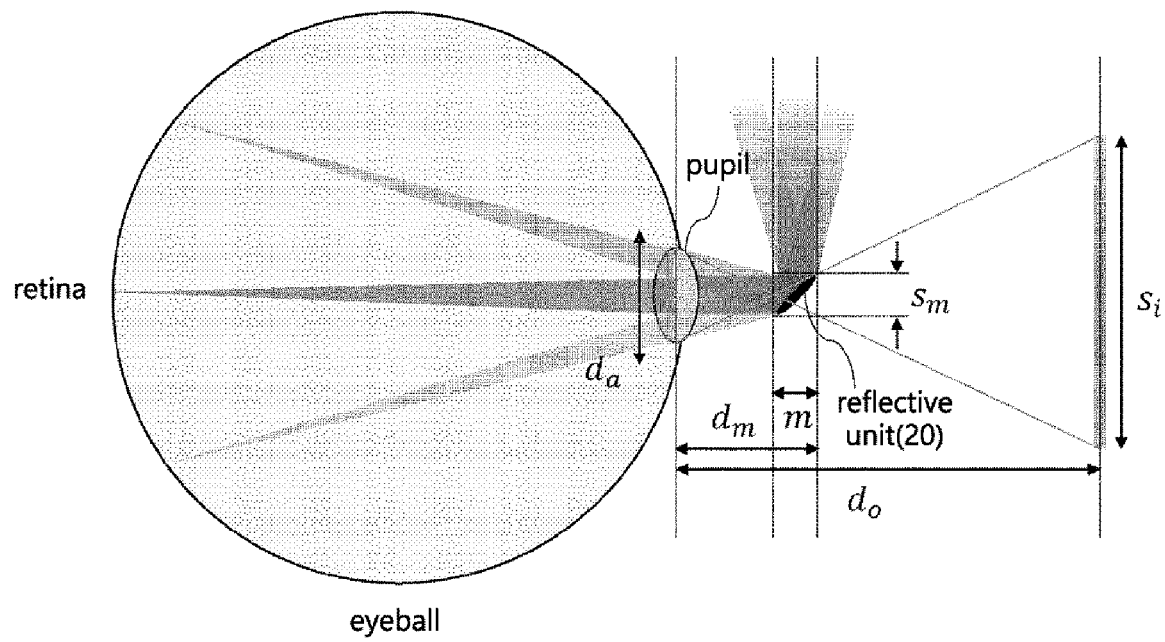
FIG. 5 is a view illustrating the size of an image for augmented reality seen through one reflective unit (20)

FIG. 5 is a view illustrating the size of an image for augmented reality seen through one reflective unit 20.

As illustrated in FIG. 4, the incident light incident through the reflective unit 20 is formed on the retina according to an angle of incidence with respect to the eyeball, and the size of an image for augmented reality may be known according to the location at which the incident light incident from the reflective unit 20 through the outermost location of the pupil 30 forms an image on the retina.

In FIG. 5, when $s_i$ is the size of the image for augmented reality observed by a user through the reflective unit 20, $s_i$ may be represented by the equation below:

$$s_i = d_a \frac{d_o - d_m + m}{d_m - m} \quad (1)$$

$$m = \frac{s_m d_m}{s_m + d_a} \quad (2)$$

$d_a$: the size of the pupil 30
$d_o$: the location of the image for augmented reality
$d_m$: eye relief (the distance between the reflective unit 20 and the pupil 30)
$s_m$: the size of the reflective unit 20
$m$: center deviation attributable to the size of the reflective unit 20

[Equation 1] is derived by the proportional equation of a triangle formed between the reflective unit 20 and the pupil 30 and the size of the reflective unit 20 and $s_i$ of the image for augmented reality. In other words, it may be derived by the relationship $$\frac{s_i}{d_a} = \frac{d_o - d_m + m}{d_m - m}.$$

Furthermore, [Equation 2] is derived by the proportional equation of a triangle formed between the reflective unit 20 and the pupil 30 and a triangle formed by the reflective unit 20. In other words, $$\frac{m}{s_m} = \frac{d_m - m}{d_a}.$$

When this equation is arranged for m, [Equation 2] may be obtained.

Figure 6:
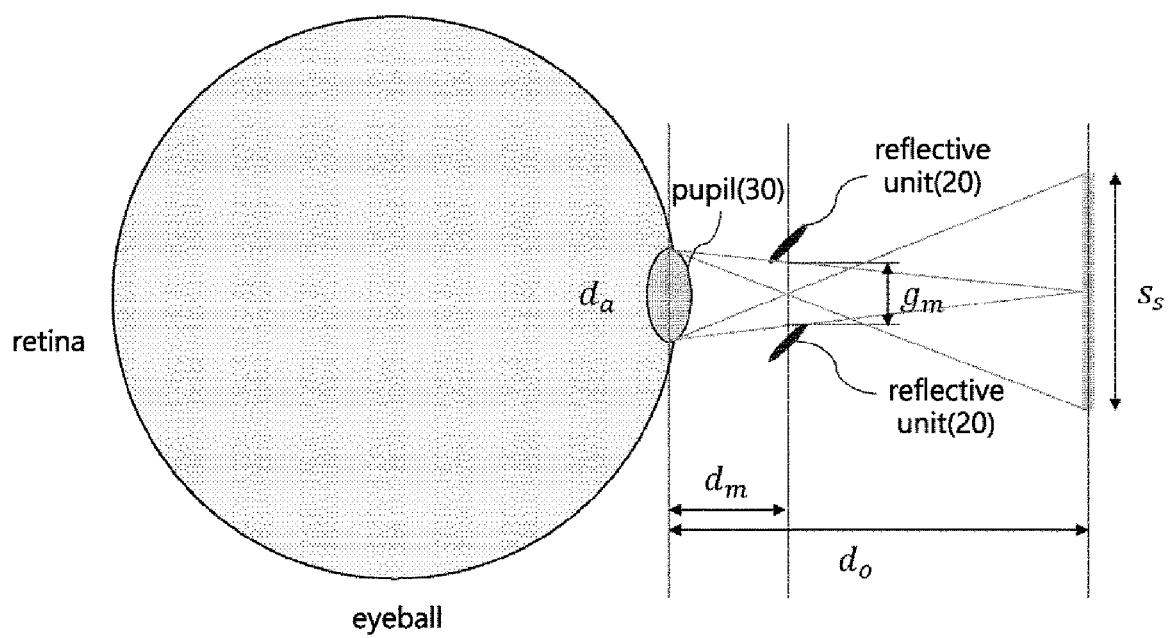
FIG. 6 is a diagram illustrating the interval between two reflective units (20) when the two reflective units (20) are disposed.

FIG. 6 is a diagram illustrating the interval between two reflective units 20 when the two reflective units 20 are disposed.

In FIG. 6, $s_s$ may be defined as the size of an image for augmented reality when the image for augmented reality is observed at the central location of the interval between two adjacent reflective units 20. In order for the image for augmented reality to be continuously observed through the two reflective units 20, $s_s$ has to be equal to or smaller than $s_i$. This may be represented by the equation below:

$$s_s \le d_a \frac{d_o - d_m}{d_m} \le s_i = d_a \frac{d_o - d_m + m}{d_m - m} \quad (3)$$

Meanwhile, the interval $g_m$ between the reflective units 20 may be defined based on the proportional equation of a triangle, as follows:

$$g_m \le d_a \frac{d_o - d_m}{d_o} \quad (4)$$

In this case, it can be seen that since $d_o$ is always larger than $d_m$, the interval between the reflective units 20 is smaller than $d_a$, which is the size of the pupil 30.

FIGS. 7 to 10 are views illustrating a case in which the interval between reflective units 20 is smaller than the size of the pupil 30.

Figure 7:
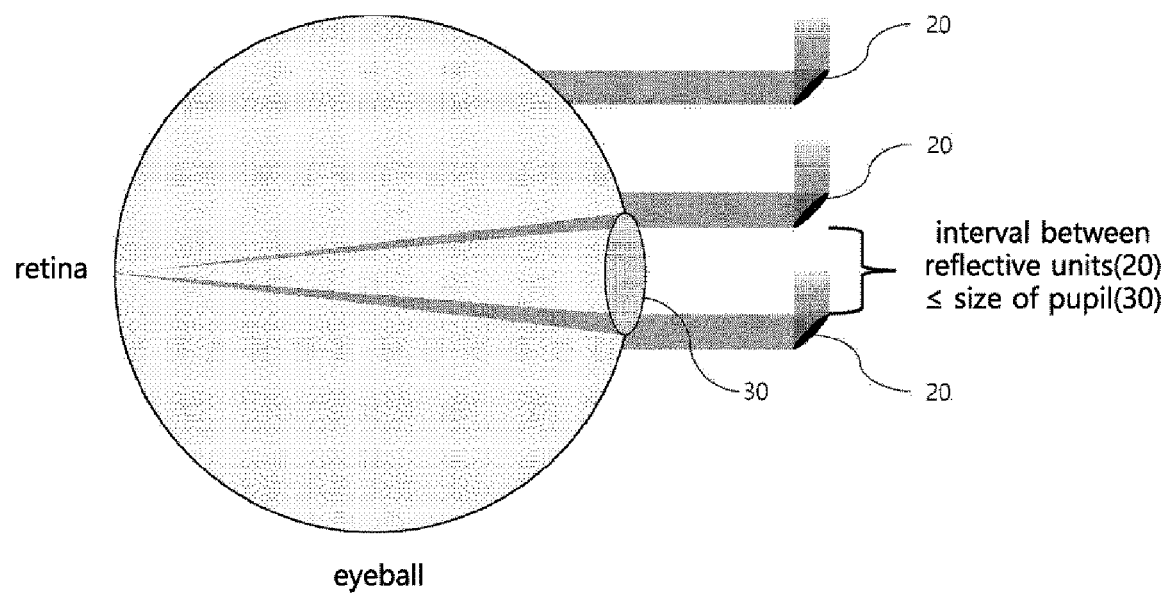
FIGS. 7 to 10 are views illustrating a case in which the interval between reflective units (20) is smaller than the size of the pupil (30)

In FIG. 7, it can be seen that the interval between the reflective units 20 is smaller than the size of the pupil 30 and the angles of incidence of rays of incident light with respect to the eyeball are all the same so that images are formed at the same location on the retina.

As shown in FIG. 7, the two adjacent reflective units 20 are disposed at the interval smaller than the size of the pupil 30. Thus, the upper reflective unit 20 overlaps the pupil 30 at the same time that the lower reflective unit 20 leaves the pupil 30, and rays of incident light reflected from the respective reflective units 20 form images at the same location on the retina.

Figure 8:
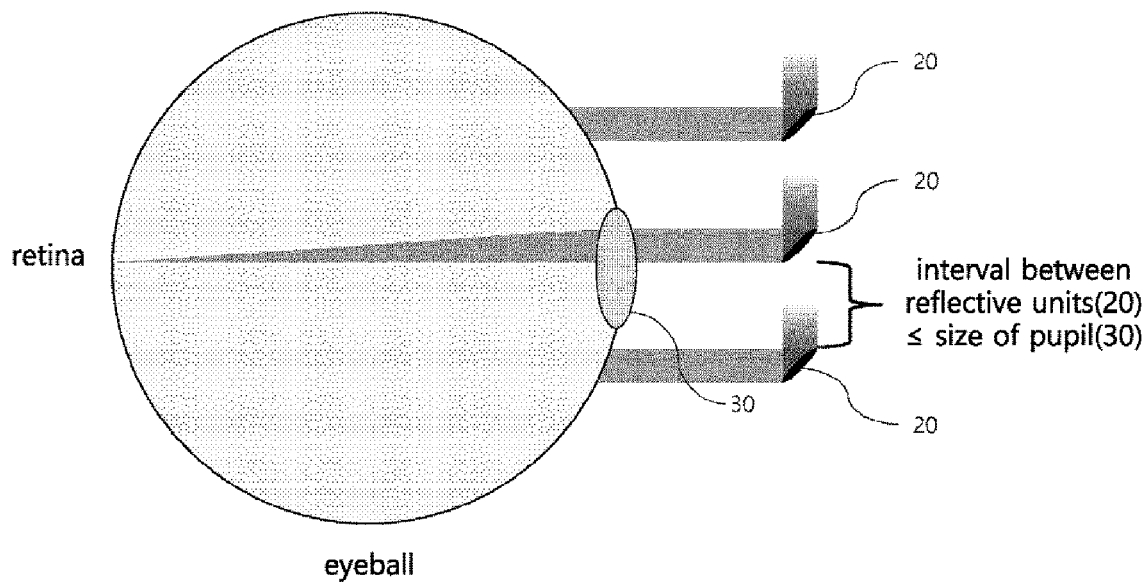
Figure 9:
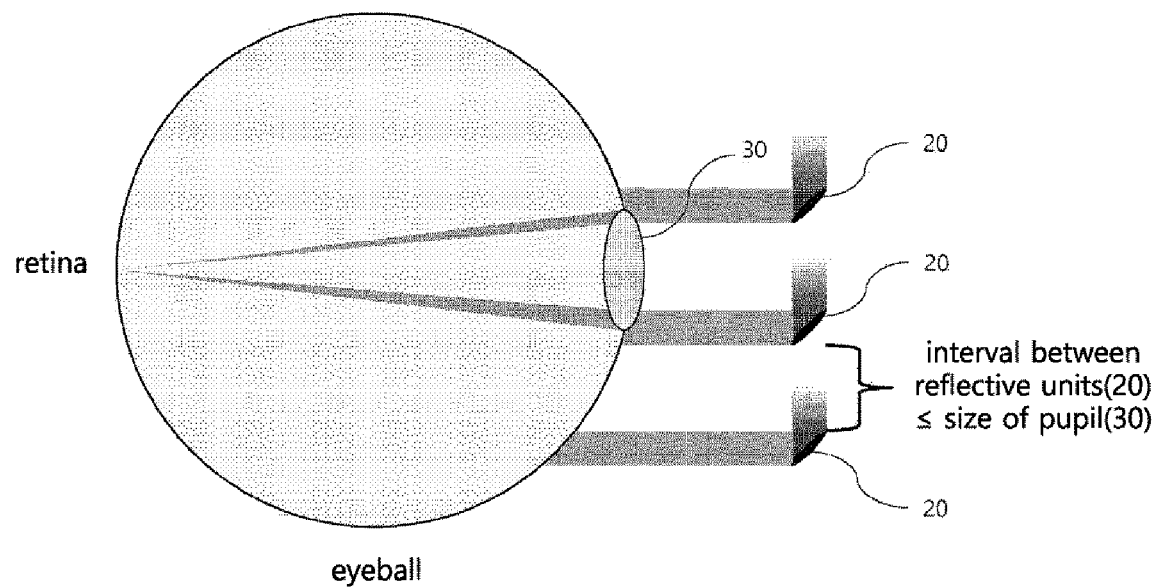

In this state, when a user further moves the pupil upward, the state shown in FIG. 8 is obtained. In this case, only the incident light from the reflection part 20 located at the center reaches the retina. When the pupil is further moved upward again, the state shown in FIG. 9 is obtained, and rays of incident light form images at the same location on the retina by the uppermost reflective unit 20 and the center reflective unit 20 in the same manner shown in FIG. 7.

Figure 10:
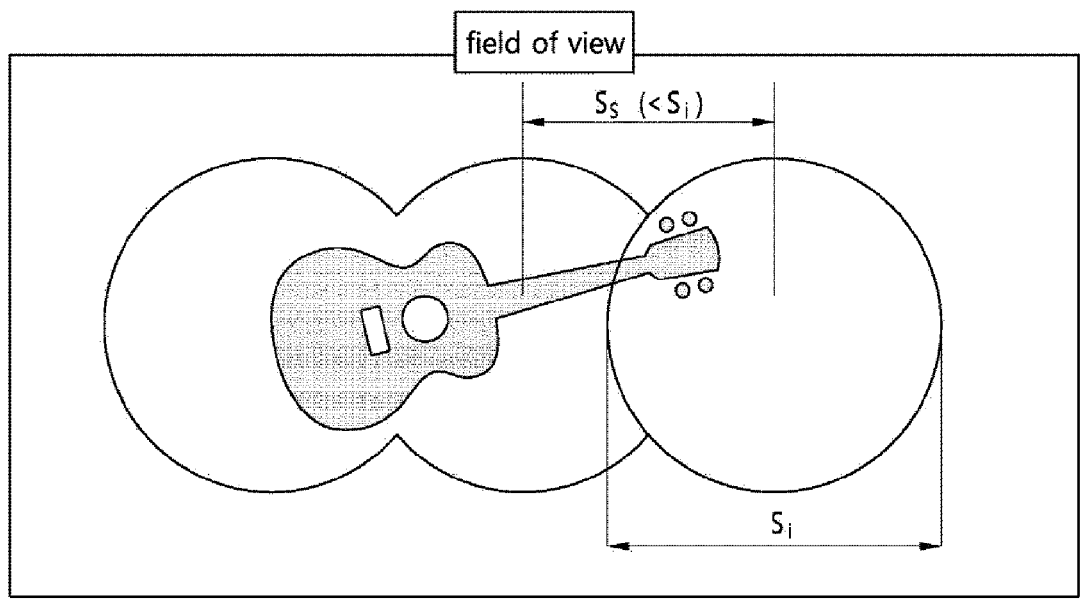

FIG. 10 shows an image for augmented reality that is observed by a user when three reflective units 20 are disposed at intervals smaller than the size of the pupil 30.

As shown in FIG. 10, the distance $s_s$ between the centers of the respective reflective units 20 is smaller than the size $s_i$ of an image observed by one reflective unit 20, and the distance between the reflective units 20 is smaller than the size of the pupil 30. Accordingly, in this case, a user may receive a guitar-shaped image for augmented reality without disconnection through the reflective units 20.

Figure 11:
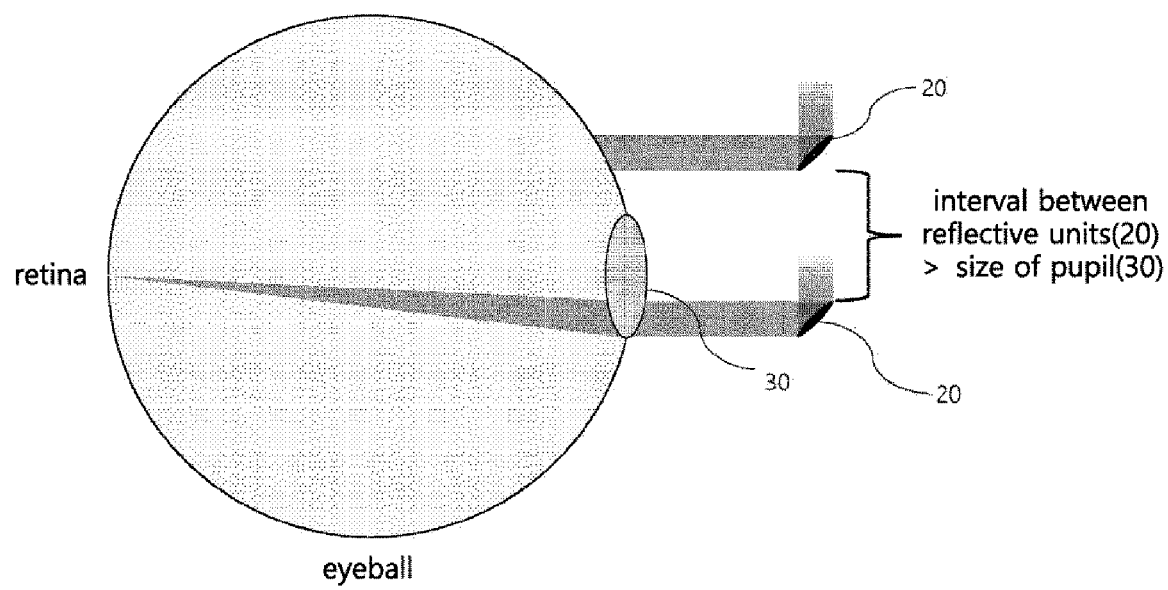
FIGS. 11 to 13 are diagrams illustrating a case in which the interval between reflective units (20) is larger than the size of the pupil (30)
Figure 12:
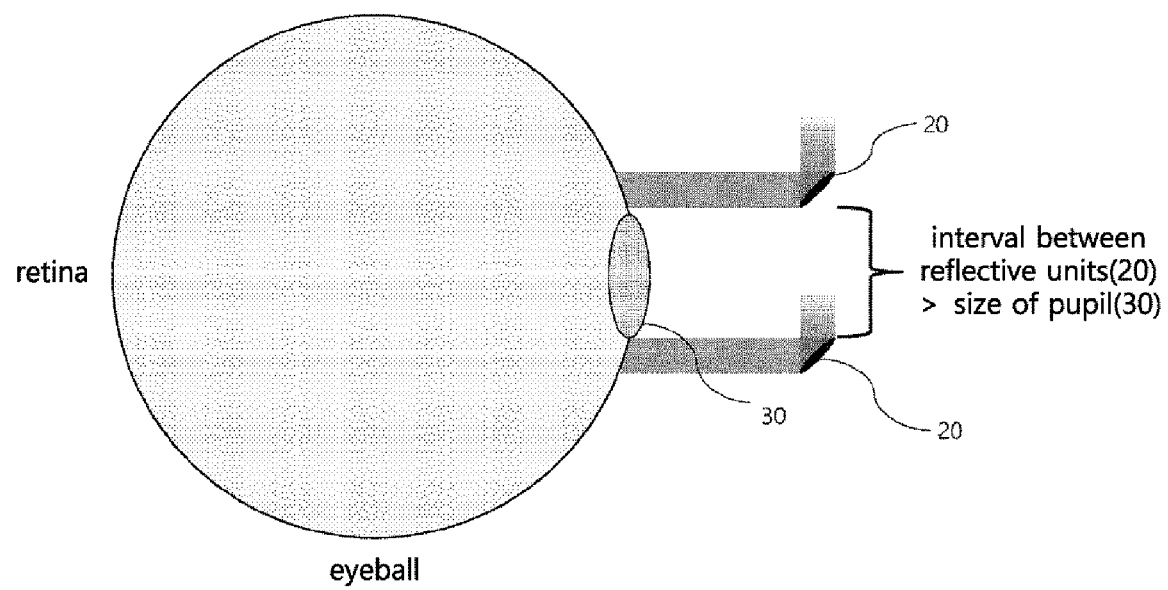
Figure 13:
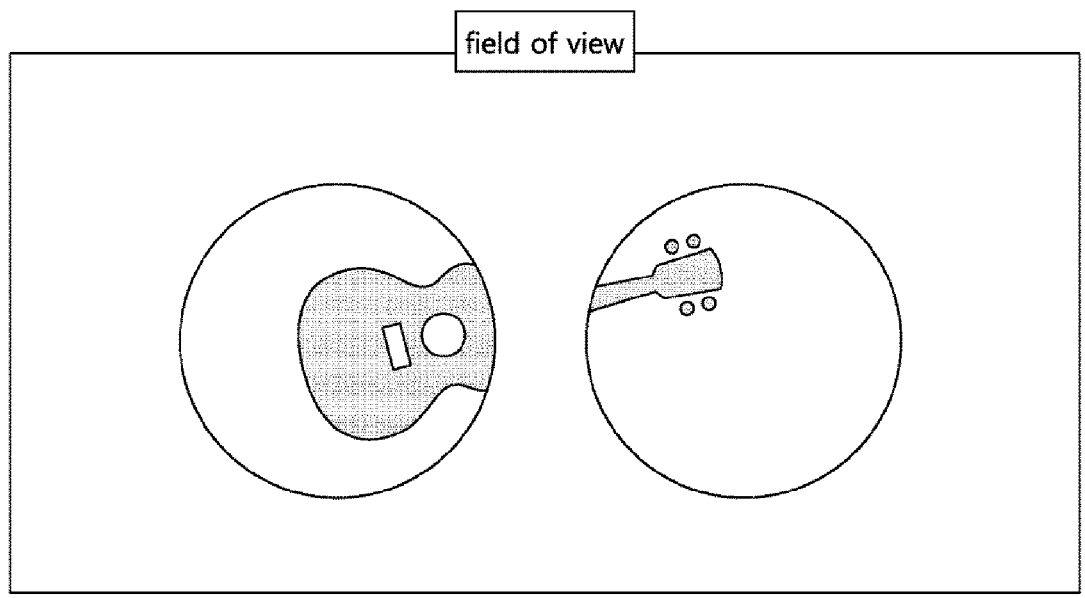

FIGS. 11 to 13 are diagrams illustrating a case in which the interval between reflective units 20 is larger than the size of the pupil 30.

In FIG. 11, the interval between the reflective units 20 has a value larger than the size of the pupil 30. As shown in FIG. 11, in a state in which an image is formed on the retina by the lower reflective unit 20, when a user moves the pupil upward, the state shown in FIG. 12 is obtained. In this case, incident light does not form an image on the retina by means of either of the upper and lower reflective units 20. Accordingly, as shown in FIG. 13, the user observes an image for augmented reality in which disconnection occurs in the middle thereof.

Meanwhile, according to another aspect of the present invention, the shape of each of a plurality of reflective units 20 may be formed in a shape such as a circle, a square, a triangle, or the like when viewed from a location in front thereof, but is not limited thereto. It may have any desired shape.

Figure 14:
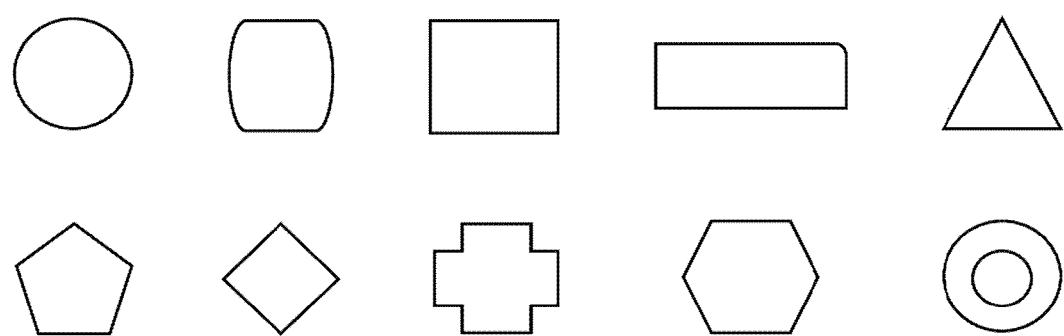
FIG. 14 illustrates various shapes when reflective units (20) are viewed from a location in front thereof.

FIG. 14 illustrates various shapes when reflective units 20 are viewed from a location in front thereof. In addition to the shapes of the reflective units 20 shown in FIG. 14, other shapes may also be applied to the present invention.

In particular, it may also be possible to form each of the plurality of reflecting units 20 in an asymmetric shape representing a shape other than a point-symmetric shape.

Here, the point-symmetric shape is defined as a shape in which there is a specific point that allows the shape to be always the same for all rotation angles when a reflective unit is rotated around a specific point on the plane of the reflective unit. The asymmetric shape is defined as a shape that is not a point-symmetric shape, i.e., a shape in which there is no specific point that allows the shape to be always the same for all rotation angles when a reflective unit is rotated around a specific point on the plane of the reflective unit.

Examples of the point-symmetric shape include a circle and a donut shape, and examples of the asymmetric shape include a triangle, a square, an oval, a pentagon, a hexagon, and other irregular shapes.

For example, a circle is a point-symmetric shape because it always has the same shape for all rotation angles when it is rotated based on the center point of the circle. In addition, a circular shape in which a hole is formed, such as a donut shape, is also a point-symmetric shape.

Meanwhile, an equilateral triangle may not always be viewed as the same shape for all angles because the equilateral triangle becomes the same as the original shape when it is rotated by 120 degrees, 240 degrees, or 360 degrees based on the center thereof but is not the same shape as the original shape at angles other than the above angles. Accordingly, in the present invention, the equilateral triangle is classified as an asymmetric shape rather than a point-symmetric shape.

Also, a square is also classified as an asymmetric shape rather than a point-symmetric shape in the present invention because it becomes the same as the original shape each time it is rotated by 90 degrees from the center point thereof but is not the same shape as the original shape at other angles.

Furthermore, all the plurality of reflective units 20 does not necessarily need to have the same shape, and at least some of the reflective units 20 may have a different shape.

FIGS. 15 to 19 are views illustrating luminous uniformity according to the shape of a plurality of reflective units 20 according to the present invention.

In FIGS. 15 to 19, the lower view is a front view when a user views the arrangement of a plurality of reflective units 20 in front thereof, and the upper view shows the luminance in each of the reflective units 20 in the arrangement of the reflective units 20 shown in the lower view. The luminance of the upper view indicates that the darker the color, the higher the luminance, and the lighter the color, the lower the luminance.

Figure 15:
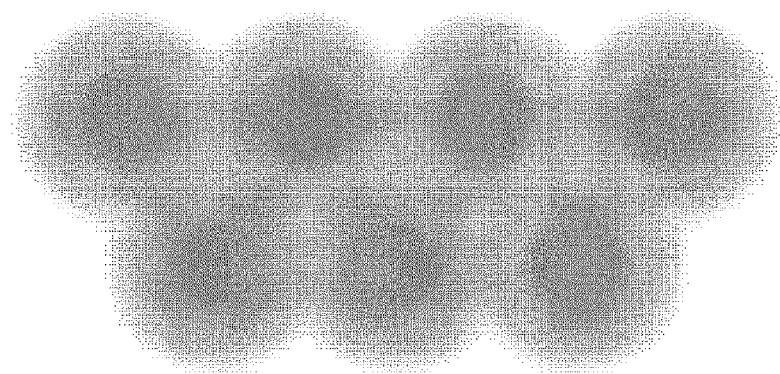
FIGS. 15 to 19 are views illustrating luminous uniformity according to the shape and arrangement of a plurality of reflective units (20) according to the present invention.
Figure 15:
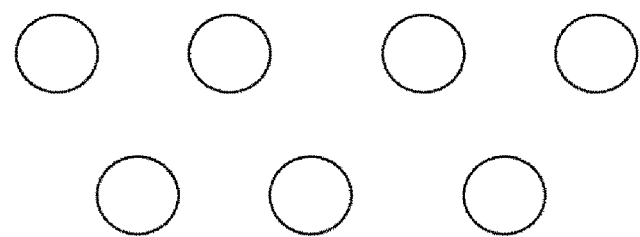

Referring to FIG. 15, it can be seen that each of the reflective units 20 has a circular shape and the luminance is low in the areas between the reflective units 20. This means that when each of the reflective units 20 is circular, the luminance at the center of the reflective unit 20 is high, but the luminance in the periphery of the reflective unit 20 and the space between the reflective units 20 is lowered. This in turn means that the difference in luminance between the center of the reflector 20 and other areas thereof is large, and also means that the overall luminous uniformity is not high.

Figure 16:
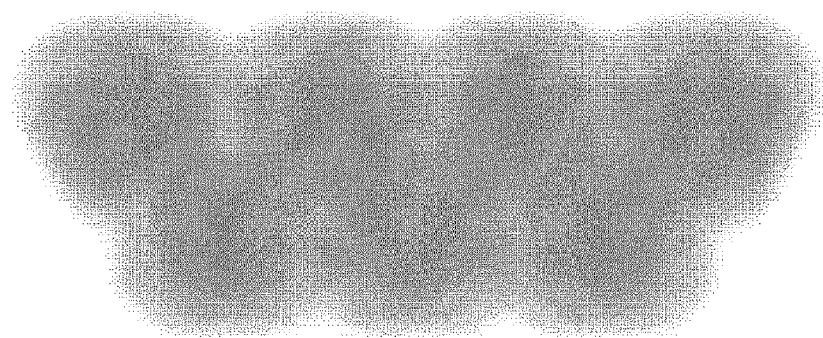
Figure 16:
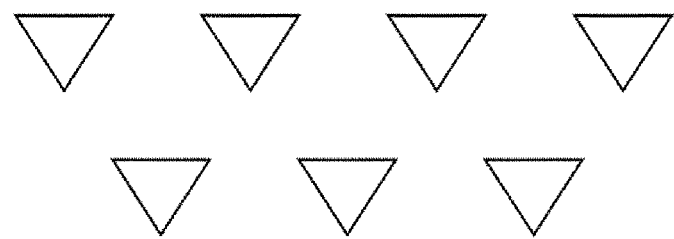

In FIG. 16, it can be seen that reflective units 20 are each arranged in an inverted triangle form, the luminance in the areas between the reflective units 20 is higher than that of FIG. 15, and the overall luminous uniformity is improved.

The reflective units 20 of FIG. 16 have an inverted triangle shape, which corresponds to the asymmetric shape defined above. It can be seen that the overall luminous uniformity of this asymmetric shape is improved compared to the circular point-symmetric shape of FIG. 15.

Figure 17:
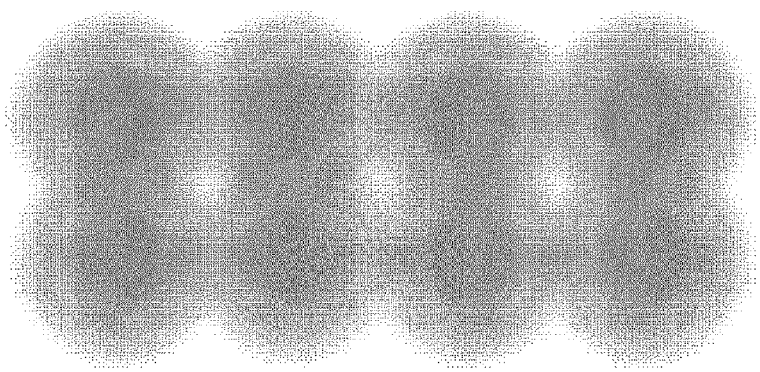
Figure 17:
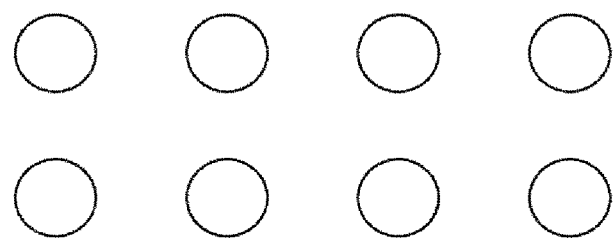

FIG. 17 shows a case where circular reflective units are disposed side by side in a 4×2 arrangement. As similar to the case of FIG. 15, the luminance of the space between the reflecting units 20 is low and thus the luminous uniformity is uneven.

Figure 18:
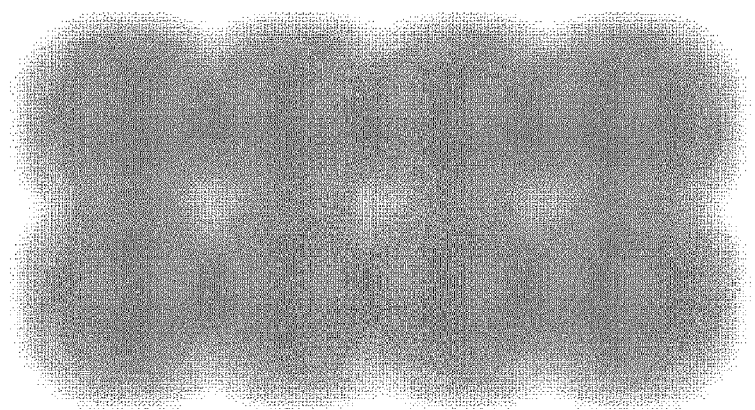
Figure 18:
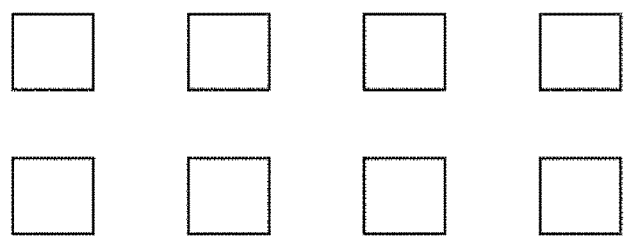

FIG. 18 shows a case in which rectangular reflective units 20 are disposed in a 4×2 arrangement. It can be seen that the luminance is evenly distributed compared to that of FIG. 16.

The reflective units 20 of FIG. 18 have a rectangular shape, which corresponds to the asymmetric shape defined above. It can be seen that the overall luminous uniformity of the asymmetric shape is improved compared to that of the circular point-symmetric shape of FIG. 17.

As described above, in the arrangement of a plurality of the reflective units 20, when the reflective units 20 are formed in an asymmetric shape rather than a point-symmetric shape, the overall luminous uniformity is improved compared to that of the point-symmetric shape.

Figure 19:
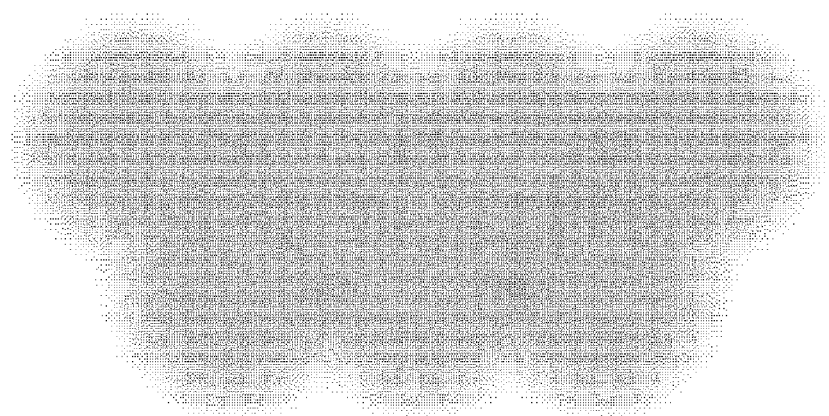
Figure 19:
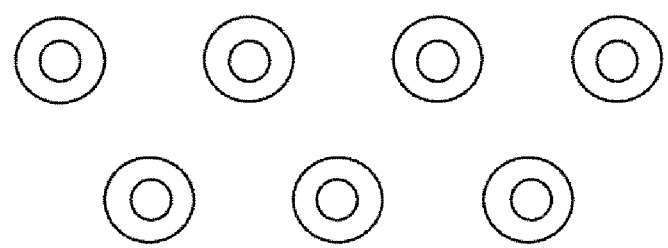

FIG. 19 shows a case in which the centers of circular reflective units 20 each in a donut shape having a through hole formed in the center thereof are each disposed to have a triangular shape similar to those shown in FIGS. 1 and 2. It can be seen that the luminance is evenly distributed. However, in the case of FIG. 19, the luminance in the centers is not higher than those of other cases.

In the reflective units 20 of the embodiment of FIG. 19, image light incident onto the through holes formed in the centers thereof is not reflected, and thus the luminance in the centers may be adjusted to a low value.

In other words, according to the embodiment of FIG. 19, it can be seen that in the case of a point-symmetric shape, the luminous uniformity can be evenly distributed by forming a through hole in the center thereof.

Referring to FIGS. 15 to 19, it can be seen that the luminance distribution varies depending on each shape or arrangement.

In the case where the overall luminous uniformity is prioritized, it would be preferable to adopt the arrangement shown in FIG. 19. In the case where it is desired to increase the luminance in the centers of reflective units 20 notwithstanding the luminous uniformity is uneven, it is preferable to select an appropriate one from the arrangements of FIGS. 15 to 17.

While the embodiments according to the present invention have been described above, the present invention is not limited to the above embodiments, and other various modifications and alterations are possible within the scope of the present invention based on the claims and the drawings.

The invention claimed is:

1. An optical device for augmented reality, the optical device comprising:
    a plurality of reflective units arranged to reflect image light, output from an image output unit configured to output image light corresponding to an image for augmented reality, toward a pupil of an eye of an user;
    wherein each of the plurality of reflective units is disposed such that a distance between adjacent reflective units is 8 mm or less, and
    wherein each of the plurality of reflective units is disposed such that a size of an image for augmented reality when the image for augmented reality is observed at a central location of an interval between two adjacent reflective units among the plurality of reflective units is equal to or smaller than a size of the image for augmented reality provided by a reflective unit among the plurality of reflective units when the reflective unit is disposed in front of the pupil of the user.

2. The optical device of claim 1, wherein the distance between the adjacent reflective units is a minimum value between points on boundary lines of orthogonal projections of the adjacent reflective units projected onto a plane perpendicular to a forward direction from the pupil when the user gazes forward.

3. The optical device of claim 1, wherein the distance between the adjacent reflective units is a minimum value between points on boundary lines of orthogonal projections of the adjacent reflective units projected onto a plane perpendicular to a direction from the pupil to the reflective units when the user gazes in a direction of the reflective units.

4. The optical device of claim 1, wherein a size of each of the plurality of reflective units is 8 mm or less.

5. The optical device of claim 4, wherein the size of each of the plurality of reflective units is a maximum length between any two points on boundary lines of corresponding reflective units.

6. The optical device of claim 4, wherein the size of each of the plurality of reflective units is a maximum length between any two points on boundary lines of orthogonal projections of corresponding reflective units projected onto a plane perpendicular to a forward direction from the pupil when the user gazes forward.

7. The optical device of claim 4, wherein the size of each of the plurality of reflective units is a maximum length between any two points on boundary lines of orthogonal projections of corresponding reflective units projected onto a plane perpendicular to a direction from the pupil to the reflective units when the user gazes in a direction of the reflective units.

8. The optical device of claim 1, wherein an area of each of the plurality of reflective units is formed to have a value of $16\pi$ (mm$^2$) or less.

9. The optical device of claim 8, wherein the area of each of the plurality of reflective units is an area of an orthogonal projection of the reflective unit projected onto a plane perpendicular to a forward direction from the pupil when the user gazes forward.

10. The optical device of claim 8, wherein the area of each of the plurality of reflective units is an area of an orthogonal projection of the reflective unit projected onto a plane perpendicular to a direction from the pupil to the reflective unit when the user gazes in a direction of the reflective unit.

11. The optical device of claim 1, wherein a shape of each of the plurality of reflective units is formed in an asymmetric shape representing a shape other than a point-symmetric shape.

12. The optical device of claim 11, wherein the point-symmetric shape is a shape in which there is a specific point that allows the shape to be always a same shape for all rotation angles when a corresponding reflective unit is rotated around a specific point on a plane of the reflective unit, and the asymmetric shape is a shape that is not a point-symmetric shape, which is a shape in which there is no specific point that allows the shape to be always a same shape for all rotation angles when a corresponding reflective unit is rotated around a specific point on a plane of the reflective unit.

13. The optical device of claim 11, wherein the shape of each of the plurality of reflective units is a point-symmetric shape in which a through hole is formed in a center thereof.

14. The optical device of claim 1, wherein at least some of the plurality of reflective units have a different shape.

* * * * *